United States Patent Office 3,092,656
Patented June 4, 1963

3,092,656
METHOD OF MANUFACTURING N-SUBSTITUTED 2,2-DISUBSTITUTED-1,3-PROPANEDIOL DICARBAMATE
Leo S. Powell, Metuchen, N.J., assignor to Carter Products, Inc., New York, N.Y., a corporation of Maryland
No Drawing. Filed May 19, 1961, Ser. No. 121,274
1 Claim. (Cl. 260—482)

This invention relates to a novel method for the manufacture of N-substituted-2,2-disubstituted 1,3-propanediol dicarbamates.

The use of certain N-substituted-2,2-disubstituted-1,3-propanediol dicarbamates as therapeutic agents is well known. For example, U.S. Berger Patent No. 2,937,119 discloses a number of such compounds as muscle relaxants. The present invention relates to a novel method for the production of N-substituted-2,2-disubstituted-1,3-propanediol dicarbamates having the following structure:

$$\begin{array}{c} R \\ \diagdown \\ \phantom{R}C \\ \diagup \\ R_1 \end{array} \begin{array}{c} CH_2OC(O)-N(H)-R_2 \\ \\ CH_2OC(O)-N(R_4)-R_3 \end{array}$$

wherein R and $R_1$ are selected from the group consisting of hydrogen, lower alkyl, lower alkylene and lower alkyne radicals and; wherein $R_2$ is selected from the group consisting of lower alkyl, lower alkylene and lower alkyne radicals, and wherein $R_3$ and $R_4$ are selected from the group consisting of hydrogen, lower alkyl, lower alkylene and lower alkyne radicals.

The process of this invention comprises reacting a hydroxy compound (1) having the formula:

$$\begin{array}{c} R \\ \diagdown \\ \phantom{R}C \\ \diagup \\ R_1 \end{array} \begin{array}{c} CH_2-OH \\ \\ CH_2-Z \end{array}$$

wherein R and $R_1$ have the same meaning as above and wherein Z is selected from the group consisting of —OH and $$-O-C(O)-N(R_4)-R_3$$

wherein $R_3$ and $R_4$ have the same meaning as above, with the product (2) obtained from the reaction of an alkali metal azide (a) and an appropriate acyl halide (b)

$$X-C(O)-Cl$$

wherein X is selected from the group consisting of lower alkyl, lower alkylene and lower alkyne radicals, to form any of the desired N-substituted dicarbamates.

The afore described reaction employing the reaction product of an acyl chloride and an alkali metal azide for reaction with an appropriate diol or monocarbamate may be applied (1) to a 2-substituted-1,3-propanediol to give the corresponding symmetrical N,N'-disubstituted dicarbamate, (2) to convert an N-unsubstituted monocarbamate to the corresponding N-unsubstituted-N'-substituted dicarbamate, (3) to convert an N-substituted monocarbamate to the unsymmetrical N,N'-disubstituted dicarbamate, and (4) to convert an N,N-disubstituted monocarbamate to the corresponding unsymmetrical N,N,N' trisubstituted dicarbamate. The reactions corresponding to these four types are as follows:

(1)
$$2X-C(O)-Cl + 2NaN_3 + RR_1C(CH_2OH)(CH_2OH) \longrightarrow$$
$$RR_1C(CH_2OCONHX)(CH_2OCONHX) + 2N_2 + 2NaCl$$

(2)
$$X-C(O)-Cl + NaN_3 + RR_1C(CH_2OH)(CH_2OCONH_2) \longrightarrow$$
$$RR_1C(CH_2OCONHX)(CH_2OCONH_2) + N_2 + NaCl$$

(3)
$$X-C(O)-Cl + NaN_3 + RR_1C(CH_2OH)(CH_2OCONHR_3) \longrightarrow$$
$$RR_1C(CH_2OCONHX)(CH_2OCONHR_3) + N_2 + NaCl$$

(4)
$$X-C(O)-Cl + NaN_3 + RR_1C(CH_2OH)(CH_2OCONR_3R_4) \longrightarrow$$
$$RR_1C(CH_2OCONHX)(CH_2OCONR_3R_4) + N_2 + NaCl$$

When the compound reacted with acyl chloride-alkali metal azide reaction product is a monocarbamate, equal molar proportions of monocarbamate, acyl chloride and alkali metal azide are employed. On the other hand, when the compound reached with the acyl chloride-alkali metal azide reaction product is a diol, for each mole of diol, two moles of acyl chloride and two moles of alkali metal azide are used.

The following are examples for the preparation of N-substituted dicarbamates in accordance with the process of this invention.

EXAMPLE 1

*Preparation of N,N-Diisopropyl-2-Methyl-2-Propyl-1,3-Propanediol Dicarbamate*

A solution of 26.8 g. (0.25 mole) isobutyryl chloride in 60 ml. of toluene is added dropwise to a stirred solution of 18.8 g. (0.29 mole) sodium azide in 50 ml. of water maintained at 0–10° C. After the isobutyryl chloride has been added, the mixture is stirred for one-half hour. The toluene layer is separated and washed first with two 20 ml. portions of cold 10% sodium carbonate solution and then with 50 ml. of ice water. The toluene solution of the azide is dried over calcium chloride at 5° C. The dried azide solution is added gradually to 13.2 g. (0.1 mole) of 2-methyl-2-propyl-1,3-propanediol dissolved in 100 ml. anhydrous toluene, maintained at gentle reflux during the addition. After addition of the azide solution is complete it is further refluxed for eight hours. The toluene is then removed by distillation under reduced pressure and the residue purified by crystallization from hexane. The product obtained weighs 26.3 g. (87%) and melts at 69–71° C.

*Analysis.*—Calculated for $C_{15}H_{30}O_4N_2$ nitrogen 9.27%. Found: nitrogen 9.24%.

EXAMPLE 2

*Preparation of N-Isopropyl-2-Methyl-2-Propyl-1,3-Propanediol Dicarbamate*

Isobutyryl chloride (0.25 mole) is converted to isobutyryl azide as described in Example 1. This solution is added to a solution of 35 g. (0.2 mole) of 2-methyl-2-propyl-3-hydroxypropyl carbamate as described in Example 1. After removal of the toluene, the residue, which crystallizes on cooling, is purified by recrystallization from trichloroethylene. The white crystalline product weighs 47 g. (92%) and melts at 90–92°.

EXAMPLE 3

*Preparation of N-Vinyl-2-Methyl-2-Propyl-1,3-Propanediol Dicarbamate*

A toluene solution of acrylyl azide is prepared from 16 g. (0.21 mole) acrylyl chloride as described in Example 1. This solution is reacted with 29 g. (0.17 mole) 2-methyl-2-propyl-3-hydroxypropyl carbamate in anhydrous toluene as described in Example 1. The reaction mixture is refluxed for two hours. After removal of the toluene, the residue is purified by crystallization from trichloroethylene. The product obtained weighs 14.75 g. (36%) and melts at 90–92°.

*Analysis.*—Calculated for $C_{11}H_{20}O_4N_2$: C, 54.05%; H, 8.25%; N, 11.45%. Found: C, 54.08%; H, 8.33%; N, 11.47%.

EXAMPLE 4

*Preparation of N-(2-Butenyl)-N'-Ethyl-2-Methyl-2-Propyl-1,3-Propanediol Dicarbamate*

A toluene solution of propionyl azide is prepared from 5.55 g. (0.06 mole) propionyl chloride and is added dropwise to a slowly refluxing solution of 11.5 g. (0.05 mole) N-(2-butenyl)-2-methyl-2-propyl-3-hydroxypropyl carbamate dissolved in 50 ml. of anhydrous toluene as described in Example 1. The reaction mixture is refluxed for eight hours, and then the toluene removed under reduced pressure. Molecular distillation of the residue at 110° and 10 microns pressure gives 5.5 g. (37%) of product. Refractive index, $N_D^{25}=1.4732$.

*Analysis.*—Calculated for $C_{15}H_{28}O_4N_2$: C, 60.00%; H, 9.40%; N, 9.34%. Found: C, 60.31%; H, 9.88%; N, 10.29%.

EXAMPLE 5

*Preparation of N,N-Dimethyl-N'-Isobutyl-2-Methyl-2-Propyl-1,3-Propanediol Dicarbamate*

A toluene solution of isovaleryl azide is prepared from 15.1 g. (0.125 mole) isovaleryl chloride as described in Example 1. This solution is reacted with 20.3 g. (0.10 mole) N,N-dimethyl-2-methyl-2-propyl-3-hydroxypropyl carbamate dissolved in anhydrous toluene also as described in Example 1. The reaction mixture is refluxed for eight hours, the toluene removed and the residue molecularly distilled at 110° C. and 12 microns pressure to give 14 g. (46%) viscous oily product. Refractive index $$N_D^{25}=1.4600$$

*Analysis.*—Calculated for $C_{15}H_{30}O_4N_2$: C, 59.60%; H, 9.93%; N, 9.27%. Found: C, 59.77%; H, 9.92%; N, 9.69%.

Preparation of intermediates for Examples 4 and 5 are given as Examples 6 and 7.

EXAMPLE 6

*Preparation of N-(2-Butenyl)-2-Methyl-2-Propyl-3-Hydroxypropyl Carbamate*

A mixture of 63 g. (0.40 mole) 5-methyl-5-propyl-2-m-dioxanone and 36 g. (0.44 mole) 2-butenyl amine is refluxed for two hours. The excess amine is removed by distillation, and the residue distilled under reduced pressure. The fraction boiling at 134–136° at 0.04 mm. pressure is collected and weighs 66.7 g., or a yield of 73%. Refractive index, $N_D^{25}=1.4710$. Calculated for $$C_{12}H_{23}O_3N$$

N, 6.13%. Found: N, 6.30%.

EXAMPLE 7

*Preparation of N,N-Dimethyl-2-Methyl-2-Propyl-3-Hydroxy Carbamate*

A mixture of 70 g. (0.43 mole) 5-methyl-5-propyl-2-m-dioxanone and 40 g. (0.88 mole) dimethyl amine is placed in a suitable vessel equipped with a Dry-Ice condenser. The reaction mixture is refluxed for eight hours and then the excess amine is removed by warming under reduced pressure. Vacuum distillation of the residue gives 65 g. of product boiling at 80° C. and 0.02 mm. pressure, or a yield of 75%. Refractive index $$N_D^{25}=1.4542$$

*Analysis.*—Calculated for $C_{10}H_{21}O_3N$: N, 6.89%. Found: N, 7.17%.

What is claimed is:

A novel process for the production of compounds having the following structure:

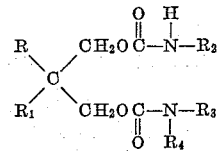

wherein R and $R_1$ are selected from the group consisting of hydrogen, lower alkyl, lower alkylene and lower alkyne radicals and; wherein $R_2$ is selected from the group consisting of lower alkyl, lower alkylene and lower alkyne radicals, and wherein $R_3$ and $R_4$ are selected from the group consisting of hydrogen, lower alkyl, lower alkylene and lower alkyne radicals, said method comprising reacting a hydroxy compound having the formula:

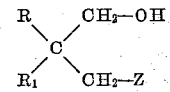

wherein R and $R_1$ have the same meaning as above and wherein Z is selected from the group of

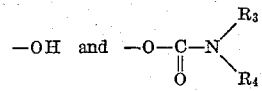

wherein $R_3$ and $R_4$ have the same meaning as above, with the product obtained from the reaction of an alkali metal azide and an appropriate acyl halide

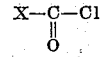

wherein X is selected from the group consisting of lower alkyl, lower alkylene and lower alkyne radicals, to form any of the desired N-substituted dicarbamates the molar proportions of the reactants in the above reaction being as follows: equal molar proportions of the hydroxy compound, acyl chloride and alkali metal azide when Z of the alcohol compound is

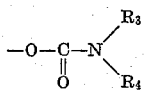

and two molar proportions of acyl chloride and two molar proportions of alkali metal azide for each molar proportion of the hydroxy compound when Z of the hydroxy compound is —OH.

No references cited.